(12) United States Patent
Sato et al.

(10) Patent No.: US 10,294,331 B2
(45) Date of Patent: May 21, 2019

(54) ACTIVE ENERGY RAY-CURABLE COMPOSITION AND USE THEREOF

(71) Applicant: SHOWA DENKO K.K., Tokyo (JP)

(72) Inventors: Akiko Sato, Tokyo (JP); Eri Hatakeyama, Tokyo (JP); Manabu Nakamura, Tokyo (JP); Asuka Toda, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 139 days.

(21) Appl. No.: 15/536,978

(22) PCT Filed: Dec. 21, 2015

(86) PCT No.: PCT/JP2015/085607
§ 371 (c)(1),
(2) Date: Jun. 16, 2017

(87) PCT Pub. No.: WO2016/104389
PCT Pub. Date: Jun. 30, 2016

(65) Prior Publication Data
US 2017/0349708 A1    Dec. 7, 2017

(30) Foreign Application Priority Data
Dec. 22, 2014  (JP) .................................. 2014-258500

(51) Int. Cl.
*C08G 75/04* (2016.01)
*C08G 75/045* (2016.01)
*C08K 3/013* (2018.01)
*F16F 7/00* (2006.01)

(52) U.S. Cl.
CPC ........... *C08G 75/045* (2013.01); *C08G 75/04* (2013.01); *C08K 3/013* (2018.01); *F16F 7/00* (2013.01)

(58) Field of Classification Search
CPC .............................. C08G 75/04; C08G 75/045
USPC .......................................................... 522/96
See application file for complete search history.

(56) References Cited

U.S. PATENT DOCUMENTS

| 3,697,395 | A | 10/1972 | Kehr et al. |
| 6,224,976 | B1 | 5/2001 | Takushima et al. |
| 6,465,092 | B1 | 10/2002 | Takushima et al. |
| 6,528,160 | B1 | 3/2003 | Takushima |
| 6,531,180 | B1 | 3/2003 | Takushima et al. |
| 6,663,957 | B1 | 12/2003 | Takushima et al. |
| 9,534,085 | B2 * | 1/2017 | Toda ...................... C08G 75/04 |
| 2003/0055203 | A1 | 3/2003 | Ooga et al. |
| 2003/0144460 | A1 | 7/2003 | Ooga et al. |
| 2016/0145392 | A1 | 5/2016 | Toda et al. |

FOREIGN PATENT DOCUMENTS

| JP | 11-071458 A | 3/1999 |
| JP | 2002-069035 A | 3/2002 |
| JP | 2007-070417 A | 3/2007 |
| JP | 4034098 B2 | 1/2008 |
| JP | 2013-067792 A | 4/2013 |
| WO | 2010/050580 A1 | 5/2010 |
| WO | 2014/203779 A1 | 12/2014 |

OTHER PUBLICATIONS

"UV•EB Koka Gijutsu no Tenbo" (Present and Prospect of UV/EB Rediation Curing Technology), CMC Shuppan, 2002, pp. 39-50.
International Search Report of PCT/JP2015/085607 dated Mar. 22, 2016 [PCT/ISA/210].
Communication dated Jul. 17, 2018 from the European Patent Office in counterpart European application No. 15872957.4.

* cited by examiner

*Primary Examiner* — Sanza L. McClendon
(74) *Attorney, Agent, or Firm* — Sughrue Mion, PLLC

(57) ABSTRACT

[Problem] To provide an active energy ray-curable composition which provides a cured product having excellent transparency as well as superior shock absorption and vibration absorption, and a cured product, a shock-absorbing material, a vibration-absorbing material and a sheet material in which said active energy ray-curable composition is used. [Solution] An active energy ray-curable composition containing (A) diallyl 1,4-cyclohexane dicarboxylate, (B) a compound having two or more mercapto groups, and (C) a polymerization initiator.

11 Claims, No Drawings

ACTIVE ENERGY RAY-CURABLE COMPOSITION AND USE THEREOF

CROSS REFERENCE TO RELATED APPLICATIONS

This application is a National Stage of International Application No. PCT/JP2015/085607, filed Dec. 21, 2015 (claiming priority based on Japanese Patent Application No. 2014-258500, filed Dec. 22, 2014), the contents of which are incorporated herein by reference in their entirety.

TECHNICAL FIELD

The present invention relates to an active energy ray-curable composition and use thereof.

BACKGROUND ART

In an ene-thiol based photocurable resin composition which is a radical polymerization type photocuring system, active thiyl radicals are regenerated even when radicals are deactivated by oxygen. Said composition therefore has advantages such that polymerization inhibition caused by oxygen that occurs in acrylic materials does not occur, that the used amount of a photopolymerization initiator can be reduced, that volume shrinkage at the time of curing can be reduced, that curing can be done in a short period of time, i.e., from a few seconds to a few minutes after the initiation of polymerization, and that cured products of thick-film having a thickness of 1 mm or more can be produced, and is gathering attention as a photocurable material (Non-Patent Document 1).

For example, Patent Document 1 discloses a photocurable resin composition comprising polyene, polythiol and a compound having a bromine-substituted aromatic ring having a specific structure, in which the mass ratio of the polyene to the polythiol is from 49:1 to 1:49, as such an ene-thiol-based photocurable resin composition. Also, Patent Document 2 discloses an ene-thiol-based photocurable resin composition comprising a polyene compound, and a (poly)thiol-based monomer consisting of a reaction product of a polyvalent amine compound and a mercaptocarboxylic acid compound.

The technology disclosed in Patent Document 1 provides a photocurable resin composition having a high refractive index, in which the refractive index can be adjusted with high precision. The technology disclosed in Patent Document 2 provides a cured product that can be cured in a short period of time without polymerization inhibition caused by oxygen and with reduced volume shrinkage, and in which the amount of a photopolymerization initiator used can be reduced and humidity resistance is notably improved. However, Patent Documents 1 and 2 do not in any way mention the shock absorption and vibration absorption of the cured product.

Patent Document 3 discloses a transparent resin consisting of a cured product of a polymerizable composition comprising at least one of diallyl phthalate, diallyl isophthalate and diallyl terephthalate, and pentaerythritol tetra(3-mercaptopropionate). However, the concept of the shock properties described in Patent Document 3 which concern penetration of a ball and scattering of a sample is close to that of toughness and elongation properties, which are different from shock absorption in terms of rebound properties. Also, there is no mention of turbidity (haze) and yellowing (b* value) which indicate transparency.

PRIOR ART DOCUMENTS

Patent Documents

Patent Document 1: JP 4034098 (B2)
Patent Document 2: JP 2007-070417 (A)
Patent Document 3: JP H11-71458 (A)

Non-Patent Document

Non-Patent Document 1: "UV•EB Koka Gijutsu no Tenbo", CMC Shuppan, 2002, p. 39-50

SUMMARY OF THE INVENTION

Problem to be Solved by the Invention

The present invention was made in consideration of the aforementioned problems, and the object of the present invention is to provide an active energy ray-curable composition which provides a cured product having excellent transparency as well as superior shock absorption and vibration absorption. It is also an object of the present invention to provide a cured product, a shock-absorbing material, a vibration-absorbing material and a sheet material obtained from said active energy ray-curable composition.

Means for Solving the Problem

As a result of an intensive study, the inventors of the present invention found that a cured product suitable as shock-absorbing materials and vibration-absorbing materials that excel in shock absorption, vibration absorption and the like can be obtained after active energy ray irradiation by using an active energy ray-curable composition comprising (A) diallyl 1,4-cyclohexane dicarboxylate, (B) a compound having two or more mercapto groups, and (C) a polymerization initiator. The present invention described below was thus completed.

The present invention relates to an active energy ray-curable composition of (1) to (6), a cured product of (7), a shock-absorbing material of (8), a vibration-absorbing material of (9) and a sheet material of (10) described below.

(1) An active energy ray-curable composition comprising a component (A): diallyl 1,4-cyclohexane dicarboxylate, a component (B): a compound having two or more mercapto groups, and a polymerization initiator (C).

(2) The active energy ray-curable composition as described in (1), wherein all mercapto groups in the component (B) are bound to a secondary carbon atom or a tertiary carbon atom.

(3) The active energy ray-curable composition as described in (1) or (2), wherein a ratio of the number of allyl groups in the component (A) to the number of mercapto groups in the component (B) is within a range from 30:70 to 70:30, and wherein the polymerization initiator (C) is contained in an amount of 0.01 parts by mass to 10 parts by mass relative to a total of 100 parts by mass of the component (A) and the component (B).

(4) The active energy ray-curable composition as described in any one of (1) to (3) further comprising a urethane (meth)acrylate.

(5) The active energy ray-curable composition as described in (4), wherein a ratio of a sum of the number of allyl groups in the component (A) and the number of (meth)acryloyloxy groups in the urethane (meth)acrylate to the number of mercapto groups in the component (B) is within a range from 30:70 to 70:30, and wherein the polymerization initiator (C) is contained in an amount of 0.01 parts by mass to 10 parts by mass relative to a total of 100 parts by mass of the component (A), the urethane (meth)acrylate, and the component (B).

(6) The active energy ray-curable composition as described in any one of (1) to (5) further comprising an inorganic filler.

(7) A cured product, wherein an active energy ray-curable composition as described in any one of (1) to (6) is cured.

(8) A shock-absorbing material, wherein an active energy ray-curable composition as described in any one of (1) to (6) is cured.

(9) A vibration-absorbing material, wherein an active energy ray-curable composition as described in any one of (1) to (6) is cured.

(10) A sheet material, wherein an active energy ray-curable composition as described in any one of (1) to (6) is cured.

Effects of the Invention

The present invention provides an active energy ray-curable composition which provides a cured product having excellent transparency as well as superior shock absorption and vibration absorption. The present invention also provides a cured product, a shock-absorbing material, a vibration-absorbing material and a sheet material obtained from said active energy ray-curable composition.

MODE FOR CARRYING OUT THE INVENTION

The active energy ray-curable composition of the present invention (this composition may hereinafter be simply called "the composition of the present invention") is characterized by comprising (A) diallyl 1,4-cyclohexane dicarboxylate, (B) a compound having two or more mercapto groups, and (C) a polymerization initiator.

[Components]

The components that constitute the composition of the present invention are explained as follows.

<Component (A)>

The component (A) is diallyl 1,4-cyclohexane dicarboxylate, which is available from Showa Denko K.K. under a trade name H-DATP. Transparency can be improved by using the component (A).

<Component (B)>

The component (B) preferably has mercapto group-containing groups in which a carbon atom at the α position and/or the β position to the mercapto group has a substituent. At least one of said substituents is preferably an alkyl group.

A structure in which a carbon atom at the α position and/or the β position to the mercapto group has a substituent means a structure in which there is a branching at the carbon at the α position and/or the β position to the mercapto group, in other words, a branched structure in which the carbon at the α position and/or the β position to the mercapto group is bonded to three or more atoms other than a hydrogen atom. A case in which at least one of said substituents is an alkyl group means that at least one substituent that is bonded to the carbon at the α position and/or the β position to the mercapto group and that is not in the main chain is an alkyl group. Here, the main chain is the longest chain structure containing a mercapto group and composed of atoms other than hydrogen.

A group represented by the following formula (1) is preferable as the mercapto group-containing group.

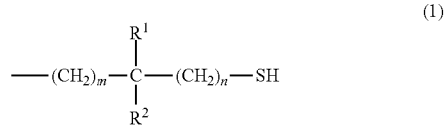

In the formula (1), $R^1$ and $R^2$ each independently represent a hydrogen atom or a $C_{1-10}$ alkyl group, where at least one of $R^1$ and $R^2$ is an alkyl group. In other words, there is no need for both $R^1$ and $R^2$ to be a hydrogen atom. When both $R^1$ and $R^2$ represent an alkyl group, said alkyl groups may be the same or different.

The $C_{1-10}$ alkyl groups represented by $R^1$ and $R^2$ may be linear or branched, and examples thereof include a methyl group, an ethyl group, a n-propyl group, an iso-propyl group, a n-butyl group, an iso-butyl group, a tert-butyl group, a n-hexyl group, a n-octyl group and the like, preferably a methyl group or an ethyl group.

m is 0 or an integer from 1 to 2, preferably 0 or 1, and n is 0 or 1, preferably 0.

Although there is no limitation to the component (B) as long as it is a compound having two or more mercapto groups, it is preferably a polyfunctional thiol compound having two or more above-mentioned mercapto group-containing groups. The two or more above-mentioned mercapto group-containing groups may be the same or different.

By using a polyfunctional compound, photopolymerization sensitivity can be improved compared with cases in which a monofunctional compound is used.

It is more preferable that the mercapto group-containing group represented by the formula (1) contained in the component (B) has a carboxylic acid derivative structure as shown by the following formula (3).

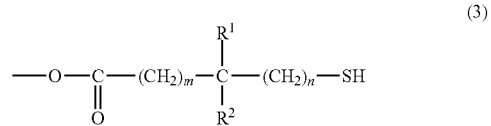

The component (B) is more preferably an ester of a mercapto group-containing carboxylic acid represented by the following formula (2) and an alcohol.

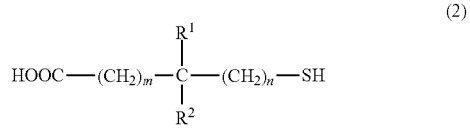

A polyfunctional alcohol is preferably used as the alcohol. By using a polyfunctional alcohol, a polyfunctional thiol compound can be obtained after an esterification reaction.

Examples of the polyfunctional alcohol include alkylene glycol (carbon number of the alkylene group is preferably from 2 to 10, and the carbon chain thereof may be branched), diethylene glycol, glycerin, dipropylene glycol, trimethylolpropane, pentaerythritol and dipentaerythritol. Examples of alkylene glycol include ethylene glycol, trimethylene glycol, 1,2-propylene glycol, 1,2-butanediol, 1,3-butanediol, 2,3-butanediol and tetramethylene glycol.

Preferable polyfunctional alcohols are alkylene glycols in which the carbon number of the alkylene main chain is two such as ethylene glycol, 1,2-propylene glycol and 1,2-butanediol, and trimethylolpropane.

Examples of the mercapto group-containing carboxylic acids of the formula (2) include 2-mercaptopropionic acid, 3-mercaptobutyric acid, 2-mercaptoisobutyric acid, 3-mercaptoisobutyric acid and the like.

The following compounds can be mentioned as specific examples of thiol compounds having the structure of the formula (1).

Examples of hydrocarbon dithiols include 2,5-hexanedithiol, 2,9-decanedithiol, 1,4-bis(1-mercaptoethyl)benzene and the like.

Examples of compounds containing an ester bond structure include di(1-mercaptoethyl ester) phthalate, di(2-mercaptopropyl ester) phthalate, di(3-mercaptobutyl ester) phthalate, di(3-mercaptoisobutyl ester) phthalate and the like.

Preferable examples include ethylene glycol bis(3-mercaptobutyrate), propylene glycol bis(3-mercaptobutyrate), diethylene glycol bis(3-mercaptobutyrate), butanediol bis(3-mercaptobutyrate), octanediol bis(3-mercaptobutyrate), trimethylolpropane tris(3-mercaptobutyrate), pentaerythritol tetrakis(3-mercaptobutyrate), dipentaerythritol hexakis(3-mercaptobutyrate), ethylene glycol bis(2-mercaptopropionate), propylene glycol bis(2-mercaptopropionate), diethylene glycol bis(2-mercaptopropionate), butanediol bis(2-mercaptopropionate), octanediol bis(2-mercaptopropionate), trimethylolpropane tris(2-mercaptopropionate), pentaerythritol tetrakis(2-mercaptopropionate), dipentaerythritol hexakis(2-mercaptopropionate), ethylene glycol bis(3-mercaptoisobutyrate), propylene glycol bis(3-mercaptoisobutyrate), diethylene glycol bis(3-mercaptoisobutyrate), butanediol bis(3-mercaptoisobutyrate), octanediol bis(3-mercaptoisobutyrate), trimethylolpropane tris(3-mercaptoisobutyrate), pentaerythritol tetrakis(3-mercaptoisobutyrate), dipentaerythritol hexakis(3-mercaptoisobutyrate), ethylene glycol bis(2-mercaptoisobutyrate), propylene glycol bis(2-mercaptoisobutyrate), diethylene glycol bis(2-mercaptoisobutyrate), butanediol bis(2-mercaptoisobutyrate), octanediol bis(2-mercaptoisobutyrate), trimethylolpropane tris(2-mercaptoisobutyrate), pentaerythritol tetrakis(2-mercaptoisobutyrate), dipentaerythritol hexakis(2-mercaptoisobutyrate), ethylene glycol bis(4-mercaptovalerate), propylene glycol bis(4-mercaptoisovalerate), diethylene glycol bis(4-mercaptovalerate), butanediol bis(4-mercaptovalerate), octanediol bis(4-mercaptovalerate), trimethylolpropane tris(4-mercaptovalerate), pentaerythritol tetrakis(4-mercaptovalerate), dipentaerythritol hexakis(4-mercaptovalerate), ethylene glycol bis(3-mercaptovalerate), propylene glycol bis(3-mercaptovalerate), diethylene glycol bis(3-mercaptovalerate), butanediol bis(3-mercaptovalerate), octanediol bis(3-mercaptovalerate), trimethylolpropane tris(3-mercaptovalerate), pentaerythritol tetrakis(3-mercaptovalerate), dipentaerythritol hexakis(3-mercaptovalerate) and the like.

Although there is no particular limitation to the molecular weight of the component (B), it is preferably from 200 to 1000 in terms of shock absorption.

Among the compounds useful as the component (B), compounds having a primary thiol and compounds having a secondary thiol are easily available as commercial products. Pentaerythritol-tetrakis(3-mercaptopropionate) (trade name: PEMP, manufactured by Sakai Chemical Co., Ltd.) and the like are commercially available as a primary thiol compound containing two or more mercapto groups in the molecule.

The following compounds can be mentioned as commercially available secondary thiol compounds containing two or more mercapto groups in the molecule: 1,4-bis(3-mercaptobutyryloxy)butane (trade name: Karenz MT BD1, manufactured by Showa Denko K.K.), pentaerythritol-tetrakis(3-mercaptobutyrate) (trade name: Karenz MT PE1, manufactured by Showa Denko K.K.), 1,3,5-tris(3-mercaptobutyloxyethyl)-1,3,5-triazine-2,4,6(1H, 3H, 5H)-trione (trade name: Karenz MT NR1, manufactured by Showa Denko K.K.), trimethylolpropane-tris(3-mercaptobutyrate) (trade name: TPMB, manufactured by Showa Denko K.K.) and the like.

The use of compounds in which all the mercapto groups are bound to a secondary carbon atom or a tertiary carbon atom as the component (B) of the present invention is preferable in terms of obtaining superior storage stability of the composition and the notably reduced odor.

<Polymerization Initiator (C)>

The polymerization initiator (C) includes a photopolymerization initiator and a thermal polymerization initiator, and there is no limitation as long as it is a compound that accelerates the initiation of the polymerization of the component (A).

There is no limitation to the photopolymerization initiator as long as it is a compound which generates radicals that contribute to the initiation of radical polymerization upon irradiation of an active energy ray such as a near-infrared ray, a visible light ray or an ultraviolet ray.

Examples of photopolymerization initiators include acetophenone, 2,2-dimethoxy-2-phenylacetophenone, diethoxyacetophenone, 1-hydroxycyclohexyl phenyl ketone, 1,2-hydroxy-2-methyl-1-phenylpropan-1-one, α-hydroxycyclohexyl phenyl ketone, 2-hydroxy-2-methyl-1-phenylpropanone, 2-hydroxy-2-methyl-1-(4-isopropylphenyl)propanone, 2-hydroxy-2-methyl-1-(4-dodecylphenyl)propanone, 2-hydroxy-2-methyl-1-[(2-hydroxyethoxy)phenyl]propanone, benzophenone, 2-methylbenzophenone, 3-methylbenzophenone, 4-methylbenzophenone, 4-methoxybenzophenone, 2-chlorobenzophenone, 4-chlorobenzophenone, 4-bromobenzophenone, 2-carboxybenzophenone, 2-ethoxycarbonyl benzophenone, 4-benzoyl-4'-methyldiphenyl sulfide, benzophenone tetracarboxylic acid or its tetramethyl ester, 4,4'-bis(dialkylamino)benzophenones (e.g. 4,4'-bis(dimethylamino)benzophenone, 4,4'-bis(dicyclohexylamino)benzophenone, 4,4'-bis(diethylamino)benzophenone, 4,4'-bis(dihydroxyethylamino)benzophenone), 4-methoxy-4'-dimethylamino benzophenone, 4,4'-dimethoxybenzophenone, 4-dimethylamino benzophenone, 4-dimethylamino acetophenone, benzyl, anthraquinone, 2-t-butylanthraquinone, 2-methylanthraquinone, phenanthraquinone, fluorenone, 2-benzyl-2-dimethylamino-1-(4-morpholinophenyl)-1-butanone, 2-(dimethylamino)-2-[(4-methylphenyl)methyl]-1-[4-(4-morpholinyl)phenyl]-1-butanone, 2-methyl-1-[4-(methylthio)phenyl]-2-morpholino-1-propanone, 2-hydroxy-2-methyl-[4-(1-methylvinyl)phenyl]propanol oligomer, benzoin, benzoin ethers (e.g. benzoin methyl ether, benzoin ethyl ether, benzoin propyl ether, benzoin isopropyl ether, benzoin isobutyl ether, benzoin phenyl ether, benzyl dimethyl ketal), acridone, chloroacridone, N-methylacridone, N-butylacridone, N-butyl-chloroacridone, 2,4,6-trimethylbenzoyl diphenylphosphine oxide, 2,6-dimethoxybenzoyl diphenylphosphine oxide, 2,6-dichlorobenzoyl diphenylphosphine oxide, 2,4,6-trimethylbenzoyl methoxyphenylphosphine oxide, 2,4,6-trimethylbenzoyl ethoxyphenylphosphine oxide, 2,3,5,6-tetramethylbenzoyl diphenylphosphine oxide, benzoyl di(2,6-dimethylphenyl) phosphonate, 1-[4-(phenylthio)phenyl]-1,2-octanedione-2-(O-benzoyloxime), 1-[9-ethyl-6-(2-methylbenzoyl)-9H-carbazol-3-yl]ethanone-1-(O-acetyloxime), 1-[9-ethyl-6-(2-methylbenzoyl)-9H-carbazol-3-yl]-3-cyclopentylpropanone-1-(O-acetyloxime), and 1-[4-phenylthio)phenyl]-3-cyclopentylpropane-1,2-dione-2-(O-benzoyloxime). Examples of bis acyl phosphine oxides include bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-propylphenylphosphine oxide, bis-(2,6-dichlorobenzoyl)-1-naphthylphosphine oxide, bis-(2,6-dimethoxybenzoyl)phenylphosphine oxide, bis-(2,6-dimethoxybenzoyl)-2,4,4-trimethylpentylphosphine oxide, bis-(2,6-dimethoxybenzoyl)-2,5-dimethylphenylphosphine oxide, bis-(2,4,6-trimethylbenzoyl)phenylphosphine oxide, (2,5,6-trimethylbenzoyl)-2,4,4-trimethylpentylphosphine oxide, 2-isopropylthioxanthone, 4-isopropylthioxanthone, 2,4-diethylthioxanthone, 2,4-dichlorothioxanthone, 1-chloro-4-propoxythioxanthone and the like.

A metallocene compound can also be used as a photopolymerization initiator. Metallocene compounds in which the central metal is a transition element typified by Fe, Ti, V, Cr, Mn, Co, Ni, Mo, Ru, Rh, Lu, Ta, W, Os, Ir or the like can be used, and bis(η5-2,4-cyclopentanedien-1-yl)-bis[2,6-difluoro-3-(pyrrol-1-yl)phenyl]titanium can be mentioned as an example of such a compound.

1-hydroxycyclohexyl phenyl ketone and 2,4,6-trimethylbenzoyl diphenylphosphine oxide are preferable particularly in terms of the stability of the active energy ray-curable composition after adding the photopolymerization initiator. The former compound is available from BASF under a trade name Irgacure 184, and the latter compound is available from BASF under a trade name LUCIRIN TPO.

There is no particular limitation to the thermal polymerization initiator and known initiators can be used as long as they do not negatively affect the physical properties of the cured products such as shock resistance. A thermal polymerization initiator that is soluble in other components that are present in the composition to be cured and that generates free radicals at a temperature from 30° C. to 120° C. is preferably used in the present invention.

Specific examples of the thermal polymerization initiator include diisopropyl peroxydicarbonate, dicyclohexyl peroxydicarbonate, di-n-propyl peroxydicarbonate, di-sec-butyl peroxydicarbonate, t-butyl perbenzoate and the like, but the thermal polymerization initiator is not limited thereto. The use of diisopropyl peroxydicarbonate is preferable in terms of curability.

The content of the photopolymerization initiator (C) in the composition of the present invention is preferably from 0.01 to 10 parts by mass, more preferably from 0.5 to 5.0 parts by mass, relative to 100 parts by mass of a total of the components (A) and (B).

When the composition of the present invention contains a urethane (meth)acrylate, the content of the polymerization initiator (C) is from 0.01 to 10 parts by mass, more preferably from 0.5 to 5.0 parts by mass, relative to 100 parts by mass of a total of the compound (A), the urethane (meth)acrylate and the compound (B).

A single type of a polymerization initiator (C) can be used alone, or two or more types can be used in combination in any proportion.

<Urethane (Meth)Acrylate>

The active energy ray-curable composition of the present invention may contain a urethane (meth)acrylate within a range that does not damage the object of the present invention. The term "urethane (meth)acrylate" is used in the present description as a generic term for urethane acrylates and urethane methacrylates.

Although there is no particular limitation to the urethane (meth)acrylate used, those having a flexible structure, in other words, a polyether structure or a polyester structure, are preferable in terms of sheet-forming properties. Examples of such a urethane (meth)acrylate include those under the trade names UA-160TM, UA-122P, UA-290TM, UA-1013P, U-200PA (manufactured by Shin-Nakamura Chemical Co., Ltd.), EBECRYL 230, 270, 284, 8411, 8413, 8800, 8804, 8413, 8402, KRM 7735, 8296 (manufactured by Daicel-Allnex Ltd.), UV-3300B, 3310B, 3700B, 6640B (manufactured by Nippon Synthetic Chemical Industry Co., Ltd.) and the like, and the use of these urethane (meth) acrylates is more preferable in terms of shock absorption.

A single type of a urethane (meth)acrylate can be used alone, or two or more types can be used in combination in any proportion.

Although there is no particular limitation to the mixed amount of the urethane (meth)acrylate, said amount is preferably from 10 to 60% by mass, more preferably from 20 to 40% by mass, relative to the total mass of the composition in terms of formability.

<Inorganic Filler>

The active energy ray-curable composition of the present invention may contain an inorganic filler within a range that does not damage the object of the present invention.

There is no particular limitation to the inorganic filler used in the present invention as long as it disperses in components (A) and (B) and forms a paste. Example of usable inorganic fillers include silica ($SiO_2$), alumina ($Al_2O_3$), titania ($TiO_2$), tantalum oxide ($Ta_2O_5$), zirconia ($ZrO_2$), silicon nitride ($Si_3N_4$), barium titanate ($BaO.TiO_2$), barium carbonate ($BaCO_3$), lead titanate ($PbO.TiO_2$), lead zirconate titanate (PZT), lead lanthanum zirconate titanate (PLZT), gallium oxide ($Ga_2O_3$), spinel ($MgO.Al_2O_3$), mullite ($3Al_2O_3.2SiO_2$), cordierite ($2MgO.2Al_2O_3.5SiO_2$), talc ($3MgO.4SiO_2.H_2O$), aluminum titanate ($TiO_2$—$Al_2O_3$), yttria-containing zirconia ($Y_2O_3$—$ZrO_2$), barium silicate ($BaO.8SiO_2$), boron nitride (BN), calcium carbonate ($CaCO_3$), calcium sulfate ($CaSO_4$), zinc oxide (ZnO), magnesium titanate ($MgO.TiO_2$), barium sulfate ($BaSO_4$), organic bentonite, carbon (C), glass powder, synthetic mica, fiber reinforcement materials such as boron nitride fiber, those obtained by mixing a silicone oil to an inorganic carrier and then grinding the same into a powder, and those obtained by grinding a silicone resin or a silicone rubber into a powder. A single type or two or more types of inorganic fillers can be used.

Among the examples of inorganic fillers mentioned above, microparticulate silica is preferably used in terms of viscosity adjustment and sheet-formability, and microparticulate silica is available from Nippon Aerosil Co., Ltd., under a trade name Aerosil (trade name). Aerosil (trade name) OX50, RX50, RY50, 50, NAX50, NY50, NA50H, NA50Y, 90G, NX90G, 130, R972, RY200S, 150, R202, 200, R974, R9200, RX200, R8200, RY200, R104, RA200H, RA200HS, NA200Y, R805, R711, R7200, 300, R976, R976S, RX300, R812, R812S, RY300, R106, 380, P25, T805, P90, NKT90, AluC, AluC805 and the like can be used, and the use of RX200 is more preferable in terms of dispersibility.

Although there is no particular limitation to the mixed amount of the inorganic filler, it is preferably used in an amount of less than 10 parts by mass, more preferably from 2 to 6 parts by mass, even more preferably from 0.1 to 5 parts by mass relative to a total of 100 parts by mass of the component (A), the component (B) and the urethane (meth)acrylate in terms of formability.

<Polymerization Inhibitor>

A polymerization inhibitor can be added to the active energy ray-curable composition of the present invention as necessary in order to improve the storage stability as a composition.

Examples of polymerization inhibitors include 4-methoxy-1-naphthol, 1,4-dimethoxynaphthalene, 1,4-dihydroxynaphthalene, 4-methoxy-2-methyl-1-naphthol, 4-methoxy-3-methyl-1-naphthol, 1,4-dimethoxy-2-methylnaphthalene, 1,2-dihydroxynaphthalene, 1,2-dihydroxy-4-methoxynaphthalene, 1,3-dihydroxy-4-methoxynaphthalene, 1,4-dihydroxy-2-methoxynaphthalene, 1,4-dimethoxy-2-naphthol, 1,4-dihydroxy-2-methylnaphthalene, pyrogallol, methylhydroquinone, tertiary-butylhydroquinone, 4-methoxyphenol, N-nitroso-N-phenylhydroxyamine aluminum and the like. These inhibitors can be used alone or in a combination of two or more types. Methylhydroquinone, pyrogallol, and tertiary-butylhydroquinone are preferably used particularly in terms of the storage stability of the active energy ray-curable composition.

Although there is no particular limitation to the mixed amount of the polymerization inhibitor, said amount is preferably less than 0.1 parts by mass, more preferably from 0.0001 to 0.05 parts by mass relative to a total of 100 parts by mass of the components (A) and (B) in terms of storage stability.

<Other Components>

If required, at least one selected from a urethane (meth)acrylate, an inorganic filler and a polymerization inhibitor may be added to the active energy ray-curable composition of the present invention in addition to the aforementioned component (A), component (B) and polymerization initiator (C), and the composition of the present invention may contain a further component as an optional component within a range that does not damage the object of the present invention. However, in the light of shock resistance and the like, it is preferable not to use a compound having an ethylenically unsaturated group and an isocyanate group in a single molecule in the composition of the present invention. For example, a mercapto compound other than those of the component (B) can be added within a range that does not damage the effects of the present invention. However, the added amount of a mercapto compound other than those of the component (B) is preferably 20% by mass or less relative to all the mercapto compounds contained in terms of maintaining shock absorption, transparency, low odor properties and the like.

A solvent can be used or not used in the composition of the present invention, but a solvent is preferably not used.

For example, a coloring material such as a carbon material, a pigment or a dye can be preferably added as a further component.

Examples of a carbon material include carbon black, acetylene black, lamp black and graphite.

Examples of a pigment include black pigments such as iron black, aniline black, cyanine black and titanium black. Also, the composition of the present invention may contain organic pigments such as red, green and blue pigments. Commercially available pigments for gel nail polish or UV resin craft can also be used, and examples of such pigments include Pika Ace color pigments (701, 731, 741, 755, 762) and transparent pigments (900, 901, 910, 920, 921, 922, 924, 930, 932, 941, 942, 945, 947, 950, 955, 957, 960, 963, 968, 970, 980, 981, 982, 985).

Examples of a dye include a direct dye, an acid dye, a basic dye, a mordant dye, an acid mordant dye, a vat dye, a disperse dye, a reactive dye, a fluorescent whitening dye and a plastic dye. A dye means a substance which has solubility to a solvent or compatibility to a resin and has the property to color dissolved or compatibilized substances. Examples of a plastic dye include KP PLAST (KP Plast Red B, KP Plast Blue GR, KP Plast Yellow HK).

A single type of coloring material can be used alone or two or more types can be used in combination.

Although there is no particular limitation to the content of the coloring material in the composition of the present invention, poor curing may occur due to the decrease of active energy ray transmittance when the concentration of the coloring material is too high. Therefore, the content of a coloring agent in the composition is normally 60% by mass or less, preferably from 0.0001 to 40% by mass.

If required, the composition of the present invention may contain the following components as a further component in addition to the aforementioned coloring material: (a) a thermoplastic resin; (b) a deodorant; (c) an adhesion improver such as a silane coupling agent or a titanium coupling agent; (d) an antioxidant such as a hindered amine, a hydroquinone or a hindered phenol; (e) an ultraviolet absorber such as a benzophenone, a benzotriazole, a salicylic acid ester or a metal complex salt; (f) a stabilizer such as a metal soap, an inorganic or organic salt of a heavy metal (e.g. zinc, tin, lead, cadmium or the like), or an organic tin compound; (g) a pH adjuster, for instance an aliphatic carboxylic acid such as acetic acid, acrylic acid, palmitic acid, oleic acid or mercaptocarboxylic acid, or an aromatic organic acid such as phenol, naphthol, benzoic acid or salicylic acid; (h) a plasticizer such as a phthalic acid ester, a phosphoric acid ester, a fatty acid ester, epoxidized soybean oil, castor oil, liquid paraffin or an alkyl polycyclic aromatic hydrocarbon; (i) a wax such as paraffin wax, microcrystalline wax, polymer wax, beeswax, sperm wax or a low-molecular-weight polyolefin; (j) a nonreactive diluent such as benzyl alcohol, tar or pitumen; (k) a filler such as acrylic resin powder or phenolic resin powder; (l) a solvent such as ethyl acetate, toluene, an alcohol, an ether or a ketone; (m) a foaming agent; (n) a dehydrating agent such as a silane coupling agent, a monoisocyanate compound or a carbodiimide compound; (o) an antistatic agent; (p) an antibacterial agent; (q) an antifungal agent; (r) a viscosity modifier; (s) a perfume; (t) a flame retardant; (u) a leveling agent; (v) a sensitizer; (w) a dispersant and the like. A single type of these components can be used alone, or two or more types can be used in combination in any proportion.

[Preparation of Active Energy Ray-curable Composition]

The composition of the present invention can be prepared by mixing a component (A), a component (B), a polymerization initiator (C), and, if required, a urethane (meth)acrylate, an inorganic filler, a polymerization inhibitor, and a further component.

A single type can be used alone for each of the component (A), the component (B) and the polymerization initiator (C), or two or more types can be mixed for use.

Components (A) and (B) are mixed so that the ratio (a:b) of the number (a) of allyl groups in the component (A) to the number (b) of mercapto groups in the component (B) is preferably from 30:70 to 70:30, more preferably from 40:60 to 60:40.

When a urethane (meth)acrylate is mixed, the components are mixed so that the ratio (a':b) of a sum (a') of the number of allyl groups in the component (A) and the number of (meth)acryloyloxy groups in the urethane (meth)acrylate to the number (b) of mercapto groups in the component (B) is preferably from 30:70 to 70:30, more preferably from 40:60 to 60:40.

There is no limitation to the preparation process of the composition of the present invention as long as the aforementioned components are mixed and dispersed, but the following processes can be mentioned, for example.

(i) All the components are kneaded in a suitable container such as a glass beaker, a can, a plastic cup or an aluminum cup with the use of a stirring rod, a spatula or the like.
(ii) All the components are kneaded with the use of double helical ribbon blades, gate blades or the like.
(iii) All the components are kneaded with a planetary mixer.
(iv) All the components are kneaded with a bead mill.
(v) All the components are kneaded with a three roll mill.
(vi) All the components are kneaded with an extruder type kneader extruder.
(vii) All the components are kneaded with a rotation/revolution mixer.

Each component can be added and mixed in any order, and all the components can be added simultaneously or stepwise.

When using a polymerization initiator (C), the handling and mixing of the aforementioned components and the pre-curing treatment can be carried out under conditions where the polymerization initiator (C) is not activated prior to the curing treatment, that is, under illumination through a filter that eliminates an absorption wavelength that causes the decomposition of the photopolymerization initiator or under no irradiation of an active energy ray, or at a temperature equal to or lower than the temperature at which a thermal polymerization initiator is activated.

[Use of Active Energy Ray-Curable Composition]

A cured product can be obtained by irradiating the composition of the present invention with an active energy ray.

The active energy ray used for curing is visible light; ultraviolet ray; microwave; high-frequency wave; ionizing radiation such as electron beam, X-ray, $\alpha$-ray, $\beta$-ray or $\gamma$-ray, and any type of energy is applicable as long as it is capable of emitting a substance that initiates polymerization. In the case of ultraviolet to visible light, for example, a high-pressure mercury lamp, a metal halide lamp, laser beam, LED light, sunlight or the like can be used. The use of ultraviolet ray is preferable since an inexpensive apparatus can be used.

Various light sources can be used for curing the composition with an ultraviolet ray. Examples include a black light, a UV-LED lamp, a high-pressure mercury lamp or a pressurized mercury lamp, a metal halide lamp, a xenon lamp and an electrodeless discharge lamp. Here, a black light is a lamp in which a near-ultraviolet light-emitting phosphor is deposited to a special outer glass tube that shields visible light and ultraviolet rays with a wavelength of 300 nm or lower so that the lamp only emits near ultraviolet rays with a wavelength from 300 to 430 nm (peak wavelength at around 350 nm). A UV-LED lamp is a lamp using a light-emitting diode that emits ultraviolet rays. Among these light sources, black lights, LED lamps (UV-LED lamps) and high-pressure mercury lamps are preferably used for safety and economic reasons.

The amount of irradiation of the active energy ray can be any amount that is sufficient for curing, and it can be selected according to the composition, amount and thickness of the composition and the shape of the cured product formed. For example, when irradiating a coating layer formed by applying the composition with an ultraviolet ray, a light exposure preferably from 200 to 5000 mJ/cm$^2$, more preferably from 1000 to 3000 mJ/cm$^2$, can be applied.

A coating layer is formed by applying the composition of the present invention onto a substrate by any conventionally known application (coating) method that is considered suitable, for example, by methods using a natural coater, a curtain flow coater, a comma coater, a gravure coater, a microgravure coater, a die coater, a curtain coater, spraying, dipping, a kiss roller, a squeeze roller, a reverse roller, an air blade coater, a knife belt coater, a floating knife, a knife over roll coater and a knife-on-blanket coater.

A sheet material is obtained by curing the composition in the form of a sheet. The sheet material may contain further components besides the composition as necessary.

A suitable thickness of the sheet material can be determined depending on the purpose of the material, but it is preferably from 0.1 to 10 mm, more preferably from 0.3 to 8 mm in terms of formability.

The cured product and the sheet material can also be suitably used as a shock-absorbing material or a vibration-absorbing material.

A shock-absorbing material and a vibration-absorbing material can be obtained by curing the composition of the present invention. The light source and the amount of irradiation for curing the composition and the application (coating) method are as described above.

If required, the shock-absorbing material and the vibration-absorbing material of the present invention may contain further components and may form a laminate with other materials. For example, a laminate can be formed with a building material such as wood, concrete or mortar; a resin material, e.g., a thermoplastic resin such as PET (polyethylene terephthalate), PC (polycarbonate) or PMMA (polymethyl methacrylate resin), or a thermosetting resin such as epoxy resin, phenolic resin or unsaturated polyester resin; glass; or a metal such as iron, aluminum or copper. Examples of laminates include (a) a mortar-cured product laminate obtained by applying the composition of the present invention to mortar, and irradiating the same with a UV light to cause curing, (b) a tape material obtained by curing the composition of the present invention in the form of a sheet, and then applying an adhesive layer to one or both sides of the sheet material, (c) a laminate film obtained by applying the composition of the present invention to a thin film composed of a thermoplastic resin such as PET, PC or PMMA, and then curing the composition, (d) a laminate film obtained by laminating a thermoplastic resin layer/a cured product layer obtained from the composition of the present invention/a thermoplastic resin layer in this order, (e) a laminate film obtained by laminating a thermoplastic resin layer/an adhesive layer/a cured product layer obtained from the composition of the present invention/a thermoplastic resin layer in this order, (f) a laminate film obtained by laminating a thermoplastic resin layer/an adhesive layer/a cured product layer obtained from the composition of the present invention/an adhesive layer/a thermoplastic resin layer in this order, (g) a glass laminate obtained by applying the composition of the present invention to a glass, and curing the same by irradiation of a UV light, (h) a glass laminate obtained by laminating a glass/a cured product layer obtained from the composition of the present invention/a glass in this order, (i) a laminate of a glass and a resin obtained by applying the composition of the present invention between a thermoplastic resin or a thermosetting resin and a glass, and then irradiating the same with a UV light, (j) a coated material obtained by applying the composition of the present invention to a material with a three-dimensional shape, and then curing the composition; and (k) a product obtained by printing on a cured product obtained from the composition of the present invention. Shock absorption and vibration absorption can be improved by forming laminates as mentioned above compared with cases in which a cured product is used alone.

EXAMPLES

The present invention will be further explained below by means of examples. However, the present invention is not limited to the examples.
<Compounds>
The following compounds were used in Examples 1 to 7 and Comparative Examples 1 to 4.
1. Component (A)
   1) H-DATP: diallyl 1,4-cyclohexane dicarboxylate manufactured by Showa Denko K.K., trade name: "H-DATP", molecular weight: 252, number of allyl groups: 2
2. Compound (a) having an ethylenically unsaturated group other than the component (A) (This compound may hereinafter be called "compound (a)".)
   1) DAP: diallyl phthalate manufactured by Daiso Chemical Co., Ltd., trade name: "DAISO DAP monomer", molecular weight: 246, number of allyl groups: 2
   2) TMPTA: trimethylolpropane triacrylate manufactured by Kyoeisha Chemical Co., Ltd., molecular weight: 296, number of acryloyloxy groups: 3
   3) isoDAP: diallyl isophthalate manufactured by Daiso Chemical Co., Ltd., trade name: "DAISO DAP 100 monomer", molecular weight: 246, number of allyl groups: 2
   4) DATP: diallyl terephthalate manufactured by Showa Denko K.K., molecular weight: 246, number of allyl groups: 2
3. Component (B)
   1) PE1: pentaerythrithol-tetrakis(3-mercaptobutyrate) manufactured by Showa Denko K.K., trade name: "Karenz MT® PE1", molecular weight: 545, number of mercapto groups: 4
   2) PEMP: pentaerythrithol-tetrakis(3-mercaptopropionate) manufactured by Sakai Chemical Industry Co., Ltd., trade name: "PEMP", molecular weight: 489, number of mercapto groups: 4
   3) TPMB: trimethylolpropane-tris(3-mercaptobutyrate) manufactured by Showa Denko K.K., trade name: "TPMB", molecular weight: 441, number of mercapto groups: 3
   4) NR1: 1,3,5-tris(3-mercaptobutyloxyethyl)-1,3,5-triazine-2,4,6(1H, 3H, 5H)-trione manufactured by Showa Denko K.K., trade name: "Karenz MT® NR1", molecular weight: 568, number of mercapto groups: 3
4. Polymerization initiator (C)
   1-hydroxy-cyclohexyl-phenyl ketone manufactured by BASF, trade name: "Irgacure 184"
5. Polymerization inhibitor
   Methylhydroquinone, manufactured by Kanto Chemical Co., Inc.
6. Urethane acrylate
   UA-160 TM, manufactured by Shin-Nakamura Chemical Co., Ltd., number of acryloyloxy groups: 2

Examples 1 to 7 and Comparative Examples 1 to 4

Active energy ray-curable compositions were obtained by mixing a component (A) or compound (a), a component (B), a polymerization initiator (C), a polymerization inhibitor, and, if required, a urethane (meth)acrylate and an inorganic filler of the types shown in Table 1 in mass ratios shown in Table 1. Subsequently, a polyethylene terephthalate (PET) film was placed on a glass plate, a silicon rubber spacer was placed thereon, and the obtained active energy ray-curable composition was poured thereonto so that the thickness after curing will be 5 mm, and a PET film and a glass plate were placed on top of the composition. A UV light of 2 J/cm$^2$ was irradiated by using a conveyor type UV irradiation machine ECS-4011 GX (high-pressure mercury lamp) manufactured by Eye Graphics Co., Ltd. so as to obtain a cured product with a thickness of 5 mm. A cured product with a thickness of 1 mm was similarly obtained by using a silicon rubber spacer and applying the composition so that the thickness after curing will be 1 mm, and irradiating the same with a UV light.

The obtained cured products were subjected to the following evaluations.
(1) Evaluation of Shock Absorption
The obtained 5 mm thick cured product was left to stand on a level iron sheet. A 60 g steel ball was freely dropped from 60 cm above the surface of the cured product, and the height of the rebound of the ball after hitting the cured product was measured. A rebound of less than 7.5 cm was ranked as A, a rebound of 7.5 cm or more and less than 15 cm was ranked as B, and a rebound of 15 cm or more was ranked as C.
(2) Evaluation of Vibration Absorption
By using test samples obtained by cutting the obtained 1 mm thick cured products into a size of 10 mm×40 mm, the value for tan δ and the temperature that provides the peak top of tan δ were measured with the use of a dynamic viscoelasticity tester DMS6100 manufactured by SII Nanotechnology at a frequency of 10 Hz and a temperature increase of 3° C./min. Since a higher tan δ value results in better vibration absorption, it is effective to have a peak top at a temperature close to room temperature in order to obtain vibration absorption at a temperature in the vicinity of room temperature. Given the above, the peak top of tan δ and the temperature range that provides the peak top of tan δ were evaluated as follows.

With respect to the peak top of tan δ, a value of 2 or more was ranked as A, a value of 0.9 or more and less than 2 was ranked as B, and a value of less than 0.9 was ranked as C.

Regarding the temperature range that provides a peak top of tan δ, a temperature range from 5° C. or higher to below 30° C. was ranked as A, a temperature range from −5° C. or higher to below 5° C. or a temperature range from 30° C. or higher to below 40° C. was ranked as B, and a temperature range of below −5° C. or 40° C. or higher was ranked as C.

(3) Evaluation of Turbidity

Turbidity of the obtained 1 mm thick cured products was measured with the use of a haze meter NDH-5000 manufactured by Nippon Denshoku Industries Co., Ltd. Higher haze indicates higher turbidity. A haze of less than 0.5 was ranked as A, a haze of 0.5 or higher and less than 1 was ranked as B, and a haze of 1 or higher was ranked as C.

(4) Evaluation of Yellowing

Yellowing of the obtained 1 mm thick cured products was measured with the use of a colorimeter SD6000 manufactured by Nippon Denshoku Industries Co., Ltd. A higher b* value indicates stronger yellowing. A b* value of less than 0.5 was ranked as A, a b* value of 0.5 or higher and less than 1 was ranked as B, and a b* value of 1 or more was ranked as C.

TABLE 1

|  |  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|
| Component (A) <parts by mass> | | | | | | | | | | | | |
| | H-DATP | 48 | 50 | 46 | 39 | 38 | 58 | 26 | | | | |
| Compound (a) <parts by mass> | | | | | | | | | | | | |
| | TMPTA | | | | | | | | 42 | | | |
| | DAP | | | | | | | | | 48 | | |
| | isoDAP | | | | | | | | | | 50 | |
| | DATP | | | | | | | | | | | 50 |
| Component (B) <parts by mass> | | | | | | | | | | | | |
| | PE1 | 52 | | | 62 | 42 | 34 | 58 | | | | |
| | PEMP | | 50 | | | | | | | 52 | 50 | 50 |
| | TPMB | | | 54 | | | | | | | | |
| | NR1 | | | | 61 | | | | | | | |
| Polymerization initiator (C) | | 0.5 | 0.5 | 0.5 | 0.5 | 0.5 | 0.5 | 0.5 | 0.5 | 0.5 | 0.5 | 0.5 |
| Urethane (meth)acrylate | | | | | | | | | | | | |
| | UA-160TM | | | | | | | 40 | | | | |
| Polymerization inhibitor | | 0.03 | 0.03 | 0.03 | 0.03 | 0.03 | 0.03 | 0.03 | 0.03 | 0.03 | 0.03 | 0.03 |
| Ratio of the numbers of functional groups | | 50/50 | 50/50 | 50/50 | 50/50 | 40/60 | 60/40 | 50/50 | 50/50 | 50/50 | 50/50 | 50/50 |
| Shock absorption [cm] | | A | B | A | A | A | B | A | C | A | C | C |
| | | 3.3 | 3.1 | 7.3 | 2.5 | 3.5 | 7.5 | 3.9 | 20.7 | 1.3 | 17 | 16 |
| Vibration absorption | Peak top value | B | B | A | A | A | B | B | C | B | B | B |
| | | 1.70 | 1.50 | 2.03 | 2.01 | 2.01 | 1.87 | 1.14 | 0.70 | 1.70 | 1.54 | 1.27 |
| | Temperature range 10 Hz [° C.] | A | B | B | A | B | B | A | B | A | A | A |
| | | 7.5 | 3.4 | −3.2 | 16.6 | 0.7 | −5.0 | 9.3 | 36.1 | 16.1 | 22.8 | 25.0 |
| Turbidity | Haze | B | B | A | B | A | B | A | A | C | C | B |
| | | 0.63 | 0.69 | 0.37 | 0.70 | 0.44 | 0.63 | 0.23 | 0.32 | 1.27 | 1.62 | 0.80 |
| Yellowing | b* | B | B | B | A | A | A | A | A | C | C | A |
| | | 0.65 | 0.55 | 0.70 | 0.31 | 0.30 | 0.20 | 0.48 | 0.36 | 1.00 | 1.5 | 0.36 |

In Table 1, the unit of the numerical values for each component of the composition is parts by weight. The ratio of the numbers of functional groups indicates (the number of allyl groups or acryloyloxy groups in the component (A) or compound (a))/(the number of mercapto groups in the component (B)). When the component (A) and a urethane (meth)acrylate are used in combination, said ratio is {(the number of allyl groups in the component (A))+(the number of (meth)acryloyloxy groups in the urethane (meth)acrylate)}/(the number of mercapto groups in the component (B)).

As is clear from the results shown in Table 1, Examples 1 to 7 excelled the comparative examples in all of shock absorption, vibration absorption, transparency and resistance to yellowing.

INDUSTRIAL APPLICABILITY

The active energy ray-curable composition of the present invention provides cured products having excellent transparency as well as superior shock absorption and vibration absorption, and cured products obtained from said active energy ray-curable composition can be suitably used as shock-absorbing materials and vibration-absorbing materials in particular.

The invention claimed is:

1. An active energy ray-curable composition comprising a component (A): diallyl 1,4-cyclohexane dicarboxylate, a component (B): a compound having two or more mercapto groups, and a polymerization initiator (C).

2. The active energy ray-curable composition according to claim 1, wherein all mercapto groups in the component (B) are bound to a secondary carbon atom or a tertiary carbon atom.

3. The active energy ray-curable composition according to claim 1, wherein a ratio of the number of allyl groups in the component (A) to the number of mercapto groups in the component (B) is within a range from 30:70 to 70:30, and wherein the polymerization initiator (C) is contained in an amount of 0.01 parts by mass to 10 parts by mass relative to a total of 100 parts by mass of the component (A) and the component (B).

4. The active energy ray-curable composition according to claim 1 further comprising a urethane (meth)acrylate.

5. The active energy ray-curable composition according to claim 4, wherein a ratio of a sum of the number of allyl groups in the component (A) and the number of (meth)acryloyloxy groups in the urethane (meth)acrylate to the number of mercapto groups in the component (B) is within a range from 30:70 to 70:30, and wherein the polymerization initiator (C) is contained in an amount of 0.01 parts by mass to 10 parts by mass relative to a total of 100 parts by mass of the component (A), the urethane (meth)acrylate, and the component (B).

6. The active energy ray-curable composition according to claim 1 further comprising an inorganic filler.

7. A cured product, wherein an active energy ray-curable composition according to claim 1 is cured.

8. A shock-absorbing material, wherein an active energy ray-curable composition according to claim 1 is cured.

9. A vibration-absorbing material, wherein an active energy ray-curable composition according to claim 1 is cured.

10. A sheet material, wherein an active energy ray-curable composition according to claim 1 is cured.

11. The active energy ray-curable composition according to claim 2, wherein a ratio of the number of allyl groups in the component (A) to the number of mercapto groups in the component (B) is within a range from 30:70 to 70:30, and wherein the polymerization initiator (C) is contained in an amount of 0.01 parts by mass to 10 parts by mass relative to a total of 100 parts by mass of the component (A) and the component (B).

* * * * *